Patented Aug. 5, 1930

1,772,360

UNITED STATES PATENT OFFICE

THOMAS AUSTIN MITCHELL, OF DENVER, COLORADO, ASSIGNOR TO LAFAYETTE M. HUGHES, OF DENVER, COLORADO

METHOD OF TREATING ALUMINUM OXIDE

No Drawing. Original application filed August 30, 1922, Serial No. 585,311. Divided and this application filed July 29, 1927. Serial No. 209,397.

My invention relates to the art of treating aluminous bearing materials to recover valuable products therefrom and more particularly to a method of treating crude aluminum oxide which occurs in nature in various forms, such as bauxite, diaspore, gibbsite, corundum and emery, associated with impurities such as silica, ferric oxide, titanic oxide, etc. This case is a division of my copending application Serial No. 585,311 filed August 30, 1922.

The main object of my invention is to provide an efficient and economical method of recovering substantially pure aluminum oxide from common alumina bearing materials, which may be silicious and contain various other impurities, and at the same time producing valuable by-products from the reagents employed. Further objects will be apparent in the following disclosure.

In the treatment of bauxite, it has been proposed to calcine it with calcium carbonate to form calcium aluminate which may subsequently be converted to a soluble sodium aluminate by leaching with a sodium carbonate solution. It, however, is found that the calcination of bauxite with calcium carbonate results in a hard vitreous mass which is not easily ground or leached, this condition being presumably brought about by the presence of silica which forms calcium silicates and serves as a bond or a flux to make a solid mass of the material.

As a result of my experimentation, I have found that an alkaline earth metal aluminate may be formed from crude aluminum oxide, such as occurs in clays and other materials, and may contain a large amount of silica as well as other impurities, by calcining it with a carbonate of such metal and that the calcine will be found in an easily leached condition, thereby resulting in a high yield, if a small amount of an alkaline earth metal sulfate, such as calcium sulfate, is interspersed throughout the aluminate. In a subsequent leaching operation, preferably with an alkali metal carbonate solution, such as sodium carbonate, the calcium sulfate will be transposed to calcium carbonate and soluble sodium sulfate formed throughout the calcine, thereby forming pores or channels which permit the carbonate solution to attack the mass readily. The presence of the alkaline earth metal sulfate appears to prevent the formation of a vitreous mass, such as a calcium aluminum silicate, and keeps the product light and easily grindable. The other elements of the alkaline earth group, barium, strontium and magnesium, may be employed in place of calcium, it being understood that the subsequent treatment after calcination will depend upon the nature of the original ingredients to be calcined. For example, if soluble magnesium sulfate is formed in the calcine, it will preferably be washed out with water before leaching with the sodium carbonate solution, thereby eliminating the formation of large amounts of sodium sulfate. Barium sulfate on the other hand is insoluble in the sodium carbonate solution and remains with the residue during leaching, whereas calcium sulfate is transposed to a carbonate during this step.

I have also found that by taking advantage of my discovery of the function of such interspersed material, the furnacing operation may be utilized to form desired by-products and to convert cheap minerals or such waste materials as ferrous sulfate or aluminum sulfate into valuable commercial salts, and to this end I employ such reagents and so carry on my process as to form the desired alkaline earth metal sulfate interspersed throughout the calcine and thereafter transpose the undesired ingredients to more useful materials or recover the original salts formed during calcination, as seems best. By employing a carbonate instead of other compounds of alkaline earth metals to form the aluminate, I insure an evolution of carbon dioxide during the reaction which aids in keeping the calcine in an easily leachable condition and furnishes a gas for later use in the recovery of sodium carbonate and the precipitation of aluminum hydroxid, thereby forming a cylic process.

In accordance with my invention I propose to calcine bauxite, diaspore and similar sulfate free, alumina bearing clays or minerals in the presence of an alkaline earth material and a non-alkali metal compound containing the sulfate radical which is capable of reacting with the alkaline earth material to form a sulfate, and the ingredients are preferably so proportioned as to form a mono-alakaline earth metal aluminate with all of the alumina present and a basic alkaline earth metal sulfate interspersed throughout the mixture.

The alkaline earth material, which is preferably a carbonate of calcium, barium, strontium or magnesium, taken either separately or in combination, is utilized preferably in a molecularly equivalent amount to combine with all of the alumina present to form a mono-alkaline earth metal aluminate therewith and to combine with all of the silica, iron oxide, titanium oxide, and other associated reactive impurities to form alkaline earth metal silicates and other compounds therewith. An additional amount of alkaline earth metal carbonate or other suitable compound is employed to combine with all of the added sulfate radical to form the interspersed alkaline earth metal sulfate and with any reactive metal, such as iron or aluminum, which may be present. The nature of the added ingredients will be predetermined in accordance with the soluble or insoluble end products which may be desired. Since I ordinarily treat the calcine in a subsequent step by leaching it with an alkali metal carbonate, such as a sodium carbonate solution, to form soluble sodium aluminate and insoluble calcium carbonate, I prefer to employ such sulfates and metal compounds as will not permit the formation of relatively cheap and undesirable materials, during the leaching operation but which give valuable metal sulfates as by-products.

The materials are prepared for the calcination operation in accordance with well known methods, as by grinding to a finely divided condition, and suitably mixing them wet or dry. The mixture may be calcined either in dry form or as a wet slurry, at a suitable temperature, such as 1300° C., after which the resulting calcined material may be stored or fed to a granulating device, using water or sodium carbonate solution for the partial extraction of the aluminate. This slurry is then carried to the leaching and decantation system, such as Dorr agitators and thickeners, for the separation of the sodium aluminate solution from the residue, after which aluminum hydroxid may be suitably precipitated therefrom as by passing carbon dioxide gas through the mass. The residues may be treated as desired to recover valuable ingredients and the hydroxid may be converted to the metal or the oxide form by well known methods.

Of the various metal sulfates or minerals containing the same which are available and may be converted to more valuable materials by my process, I prefer to employ sulfates of iron, aluminum, zinc and lead, but I may employ chromium, cobalt, nickel and manganese if desired and such materials are to be considered as full equivalents in this process. It is to be understood that the metal sulfates which I may employ exclude those in which the metal is an alkaline earth metal or an alkali metal. The material must be one which will react with the alkaline earth metal carbonate to form a sulfate interspersed throughout the calcine. For example, aluminum sulfate or minerals bearing aluminum sulfate, such as alunite, or the alums, may be incorporated with the alkaline earth metal carbonate and crude aluminum oxide ore. In this case, the alkaline earth metal carbonate, preferably calcium carbonate, is correctly proportioned to form monoalkaline earth metal aluminate with all of the alumina in the alumina ore and combine with the reactive impurities as well as to provide sufficient alkaline earth to react with all the alumina and the $SO_3$ in the aluminum sulfate to form an aluminate and an alkaline earth metal sulfate therefrom. If barium carbonate is used, an insoluble barium sulfate is formed, this salt remaining undissolved during the leaching operation. The barium compound is preferably added in an amount equivalent to the $SO_3$ present, the alumina of the aluminum sulfate being taken care of by an excess of calcium carbonate over that required by the alumina in the bauxite ore. If other alkaline earth metal carbonates are employed, a soluble metal sulfate, such as magnesium sulfate, is afterwards obtained from the filtrate. For example, I may employ dolomite and limestone for the carbonates with the materials proportioned as follows:

| | Parts by weight |
|---|---|
| Bauxite | 100 |
| Calcium carbonate | 80 |
| Magnesium carbonate | 8 |
| Aluminum sulfate | 10 |

Calcination of this mixture results in the formation of calcium aluminate and magnesium sulfate. The latter along with any other soluble salts may be washed from the calcine by leaching with water, after which the alumina content may be suitably recovered.

As an illustration of my method involving an iron compound, I may employ ferrous sulfate, in which case I use an alkaline earth metal carbonate, such as limestone, in amount equivalent to all of the alumina and the reactive impurities in the bauxite, and I employ an excess of calcium carbonate to combine with the iron, as possibly a ferrate, and combine with the sulfate radical of the iron salt to from calcium sulfate. Here again, in so far as the sulfate radical is concerned one may employ any of the alkaline earth salts to react therewith. As an example, I may use:

| | Parts by weight |
|---|---|
| Bauxite | 100 |
| Calcium carbonate | 90 |
| Ferrous sulfate | 10 |

Calcination of this mixture and subsequent leaching with a soda ash solution forms insoluble calcium carbonate and iron hydroxid and soluble sodium sulfate and aluminate. The sulfate may be thrown out by using a barium compound either in the mixture to be calcined or in a subsequent treatment. If magnesium carbonate or dolomite is used, a soluble magnesium salt is obtained by washing with water, before the step of leaching with the soda ash.

Zinc and lead salts may be similarly employed to furnish the sulfate, or carbonates of these metals combined with other sulfate bearing materials such as sulfuric acid may be used in molecular proportions with the alkaline earth metal carbonate and alumina ore to produce the desired end products.

If other salts, such as chlorides and nitrates, of the alkaline earths and metals are available as cheap raw materials, they may be employed together with a sulfate bearing material, such as sulfuric acid, to provide a metal and a sulfate radical for the reaction. If the acid radical of the salt used is volatile it may be collected and recovered from the furnace gases. Likewise, if soluble salts are formed, they may be crystallized out the same as any soluble metal sulfate which may be produced during the reaction, or they are otherwise suitably separated from the calcined mass.

It should be understood that the reactions which actually take place in practice are probably more complex than as described, but it is immaterial what compounds are formed during calcination so long as the desired end products are obtained. I calculate the proportions of the essential elements for the original mixture to insure sufficient alkaline earth material for substantially completing the reactions and to give such end products as are commercially desirable. I am not limited to any particular amount of alkaline earth metal sulfate, but merely use sufficient sulfate as determined by the analysis of the alumina ore to give a non-vitreous and easily leached calcine as well as by the amount of sulfate desired as an end product.

Having thus described my invention what I claim as new and desire to secure by Letters Patent is:

1. A method of treating crude aluminum oxide comprising the step of calcining the oxide with an alkaline earth metal compound, which is capable of reacting with aluminum oxide to form an aluminate, and the sulfate of a non-alkali metal which is capable of reacting with the alkaline earth metal compound to form alkaline earth metal sulfate, said alkaline earth metal compound being sufficient in amount to combine with all of the alumina and its reactable impurities and all of the sulfate radical present to form an aluminate having alkaline earth metal sulfate interspersed throughout the calcine.

2. A method of treating crude aluminum oxide comprising the steps of mixing the oxide with a carbonate of an alkaline earth metal and a compound containing a non-alkali metal base and the sulfate radical which is capable of reacting with the carbonate to form an alkaline earth metal sulfate, the carbonate being present in a suitable amount to form an aluminate of the alkaline earth metal with all the alumina present, to combine with the associated reactive impurities and to react with all of the sulfate radical to form a sulfate of the alkaline earth metal interspersed throughout the calcine, and calcining the mixture to form the aluminate and sulfate.

3. The method of treating crude aluminum oxide comprising the steps of mixing the oxide with an alkaline earth metal carbonate in a chemically equivalent amount to form a mono-alkaline earth metal aluminate with all of the alumina present, and with equivalent proportions of a compound containing a non-alkali metal base and the sulfate radical and an alkaline earth metal compound capable of reacting to form an alkaline earth metal sulfate, calcining the mass to form an intimate mixture of the alkaline earth metal aluminate and sulfate and subsequently recovering products from the calcine.

4. The method of treating crude aluminum oxide comprising the steps of mixing the oxide with the sulfate of a non-alkali metal and an alkaline earth metal carbonate which are capable of reacting to form an alkaline earth metal aluminate and an alkaline earth metal sulfate, calcining the same to form an intermixture of aluminate and sulfate and subsequently leaching the calcine with an alkali metal carbonate solution to form a soluble alkali metal aluminate therefrom.

5. The method of treating crude aluminum oxide comprising the steps of calcining the oxide with alkaline earth metal carbonate and a sulfate of a metal selected from the group consisting of iron, aluminum, zinc, lead, chromium, cobalt, nickel and manganese which is capable of forming alkaline earth metal sulfate and alkaline earth metal aluminate, and subsequently treating the calcine to recover an aluminum compound therefrom.

6. The method of treating crude aluminum oxide comprising the steps of mixing the oxide with alkaline earth metal carbonate and a material bearing a sulfate of a metal selected from the group consisting of iron, aluminum, zinc, lead, chromium, cobalt, nickel and manganese, said carbonate being present in an amount sufficient to form alkaline earth metal compounds with all of the other reactive ingredients, and thereafter calcining the mass to form alkaline earth aluminate, sulfate and other compounds.

7. The method of treating crude aluminum oxide comprising the steps of calcining the oxide in the presence of aluminum sulfate and an alkaline earth metal compound capable of reacting therewith to form alkaline earth metal sulfate and aluminate, and subsequently treating the calcine to recover an aluminum compound therefrom.

8. The method of treating crude aluminum oxide comprising the steps of mixing the oxide with alkaline earth metal carbonate and a material containing the element aluminum and the sulfate radical, the alkaline earth metal carbonate being present in amount sufficient to combine with all of the alumina and the sulfate radical, calcining the mixture to form alkaline earth metal aluminate and sulfate intimately mixed and subsequently recovering an aluminum compound from the calcine.

9. The method of treating crude aluminum oxide comprising the steps of mixing the oxide with aluminum sulfate and an alkaline earth metal carbonate, the amount of the latter being sufficient to react with all of the alumina and the sulfate radical present as well as with the reactive impurities, calcining the mixture to form alkaline earth metal aluminate and sulfate, washing the calcine with water to remove soluble compounds, leaching with an alkali metal carbonate solution to form a soluble aluminate and subsequently recovering an aluminum compound from the solution.

10. The method of treating crude aluminum oxide comprising the steps of mixing the oxide with alkaline earth metal carbonate in equivalent amounts to form a monoalkaline earth metal aluminate with all of the alumina present, and with aluminum sulfate and magnesium carbonate in equivalent proportions to form magnesium aluminate and magnesium sulfate with all of the aluminum sulfate present, calcining the mixture to form alkaline earth metal aluminate and sulfate, and thereafter recovering products from the calcine.

Signed at Denver, Colorado, this 21st day of July, 1927.

THOMAS AUSTIN MITCHELL.